Figure 1:
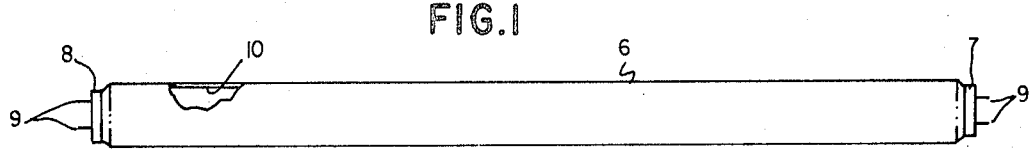

United States Patent

[11] 3,577,169

[72] Inventor Thomas L. Barry
 Beverly, Mass.
[21] Appl. No. 750,122
[22] Filed Aug. 5, 1968
[45] Patented May 4, 1971
[73] Assignee Sylvania Electric Products, Inc.
 Continuation-in-part of application Ser. No. 506,868, Nov. 8, 1965, now abandoned.

[54] COEXISTING CRYSTALLINE SOLUTION PHASES ACTIVATED BY DIVALENT EUROPIUM
 3 Claims, 3 Drawing Figs.
[52] U.S. Cl. .................................................. 313/109, 252/301.4F
[51] Int. Cl. ...................................................... H01j 1/62
[50] Field of Search ........................................... 252/301.4 (IV), 301.4; 313/108, 109

[56] References Cited
UNITED STATES PATENTS
2,961,412 11/1960 Hummel ..................... 252/301.4(IV)
3,359,211 12/1967 Jaffe ........................... 252/301.4(IV)
3,503,894 3/1970 Wachtel ..................... 252/301.4(IV)

*Primary Examiner*—Robert D. Edmonds
*Attorneys*—Norman J. O'Malley and Owen J. Meegan

ABSTRACT: A blue-emitting $Eu^{2+}$ activated, fluorescent phosphor of coexisting crystalline phases of the spinel structure of $MgAl_2O_4$ and the corundum structure of $\alpha\, Al_2O_3$ is useful in fluorescent and mercury vapor lamps. The essential cations of each structure are Al, Mg and Si. In the corundum phase, the $Si^{4+}$ and $Mg^{2+}$ ions displace $Al^{3+}$ ions, are disposed in the corundum lattice of $Al_2O_3$ and are present in significant quantities, but less than the limit of mutual solubility of the $Si^{4+}$ and $Mg^{2+}$ ions in the corundum lattice. In the spinel phase, Si atoms and site vacancies displace Mg atoms in the spinel lattice and are present in significant quantities, but less than the limit of solubility of Si atoms and vacancies in the spinel lattice.

PATENTED MAY 4 1971  3,577,169

INVENTOR
THOMAS L. BARRY
BY Owen J. Meegan
ATTORNEY

COEXISTING CRYSTALLINE SOLUTION PHASES ACTIVATED BY DIVALENT EUROPIUM

CROSS REFERENCE TO RELATED APPLICATIONS

This application is a continuation in part of my copending application Ser. No. 506,868, filed Nov. 8, 1965, now abandoned.

BACKGROUND OF THE INVENTION

This invention relates to fluorescent phosphors and especially those excited by low and high pressure mercury discharges. Specifically, this invention relates to divalent europium activation of two coexisting crystalline solution phases. One phase possesses the corundum structure ($\alpha$–$Al_2O_3$) and the other the normal spinel structure ($A^{2+IV}B_2^{3+VI}O_4$). The resultant mixture yields a phosphor of comparable blue color to the commercially available blue phosphors. Such materials can find their primary usefulness in blends with phosphors which emit other colors to produce a desired overall emission.

DESCRIPTION OF THE PRIOR ART

Earlier work on divalent europium activation of aluminosilicate phosphor compositions has been disclosed by Jaffe, U.S. Pat. No. 3,359,211. The compositions covered are represented by the formulation $x\, Al_2O_3 \cdot (1-x)SiO_2 : y$ c Eu. Different phases can be obtained depending upon the firing temperature and the raw-mix composition. However, a spinel-like phase is not disclosed and a different polymorph of alumina ($\theta$–$Al_2O_3$) is obtained. A green-yellow emitting europium aluminosilicate phosphor ($EuAl_2Si_2O_8$) has also been disclosed by Jaffe in U.S. Pat. No. 3,359,210.

SUMMARY OF THE INVENTION

The high level of luminescence of the material of the coexisting crystalline solution phases, compared to be unsubstituted structures when observed independently, that is when a crystalline solution is not employed, is due to the defect chemistry involved in the incorporation of the foreign ions. In the corundum phase ($\alpha$–$Al_2O_3$), the crystalline solution is formed by balanced ionic charge substitution ($2\, Al^{3+} = Si^{4+} + Mg^{2+}$) while in the normal spinel structure ($A^{2+IV}B^{3+VI}O_4$), the crystalline solution may be formed by several substitution schemes. The actual substitution scheme appears to be a combination of these. Two possibilities are (1) balanced ionic charge substitution, as in the corundum structure mentioned above, if the structure divalent the spinel crystalline solution phase is derived from the $\gamma$–$Al_2O_3$ defect spinel structure or more likely (2) cation vacancy formation $2Mg^{2+} = Si^{4+} + \square$ if the structure is derived from $MgAl_2O_4$ spinel with tetravalent silicon ion substituting for devalent magnesium, as above, in the tetrahedral sites. The formulation of these phases is given below:

Corundum phase: $(Al^{3+}_{2-12w}Si^{4+}_{AQw}Mg^{2+}_{w1r})^{VI} O_3 : Eu^{2+}_v$ where the sum of the cations is 2, and $w$ is within the range of detectable quantities and the mutual solubility limit of $Si^{4+}$ and $Mg^{2+}$ in corundum. $v$ is between about 0.001 and 0.20.

Spinel phase: $(Mg_{1-2x-1y}Si_x \square_x)^{IV} Al_2^{VI} O_4 : Eu_y^{2+}$ where $\square$ represents the vacancies formed in the cation lattice to preserve electroneutrality, and $y$ is between about 0.001 and 0.20, and $x$ is within the range from detectable quantities to the solubility limit of $Si^{4+}$ in $MgAl_2O_4$.

In the formulas used, the roman numerals indicate the coordination numbers, that is the number of anions which surround the given cation or cations when these are located in the given sites.

While these formulas represent the approximate compositions of the respective phases in a given fluorescent compositions, which can be identified by x-ray diffraction, the actual cation distribution may vary substantially from the formulas as written without lying outside the scope of the invention.

Figure 3:
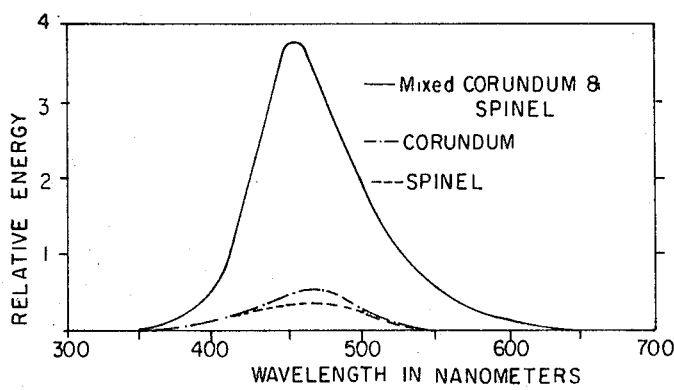

Quite surprisingly, the unsubstituted corundum and spinel phases do not exhibit substantial luminescence individually. The accompanying FIG. 3 compares the unsubstituted phases with the coexisting cyrstalline solution phases. The relative responses to 254 Nm. excitation of the corundum is about 0.5 units and the spinel is about 0.3 units. The mixture comprised of these structures, however, when crystalline solution is employed, produces a relative response of about 3.8 units.

Figure 2:
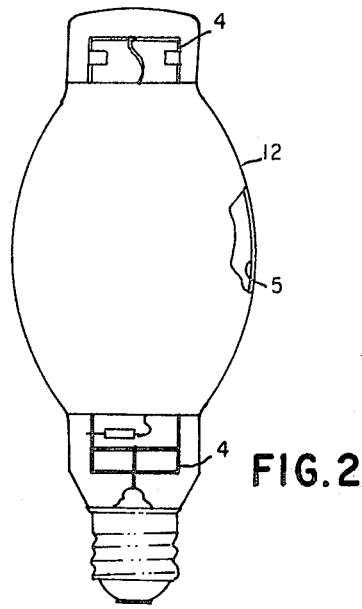

Referring now to FIG. 1, a typical fluorescent lamp containing mercury vapor is shown including a glass envelope 6 having end caps 7 and 8 with electrical lead-in wires 9 and connected to cathodes (not shown). A layer 10 of the phosphor of the present invention is coated upon the internal surface of the glass envelope 6. In FIG. 2, the high pressure mercury lamp is shown which includes the conventional arrangement of an arc tube (not shown) supported upon the metal harness 4. Surrounding the arc tube and harness is a bulbous envelope 12, with a coating 5 of the phosphor of this invention disposed upon the internal surfaces thereof.

To prepare the material, alumina, basic magnesium carbonate, and silicic acid can be mixed together and fired with a source of europium, usually europium nitrate, to produce a novel blue emitting phosphor. The necessary amount of each of the above-identified starting materials can be weighed and mixed with glass beads for blending. When blended, the material is separated from the beads and placed in an alumina boat for firing. The blend is preheated in a furnace for approximately one hour at about 650° C. to decompose the basic alkaline earth carbonate and remove other volatiles from the starting mixture. The decomposed sample is then fired in a tube furnace for approximately 1 hour between 1100° C. and 1300° C. in a reducing atmosphere of hydrogen and nitrogen. The fused silica tube can then be removed from the furnace and cooled to room temperature in the reducing atmosphere.

The following test results were obtained and compared to a standard blue emitting phosphor ($Sr_2P_2O_7$:Sn):

TABLE I

| Sample | Formulation | Plaque | | |
|---|---|---|---|---|
| | | Red | Green | Blue |
| A | $Sr_2P_2O_7:Sn^{2+}_{0.05}$ | 13 | 100 | 230 |
| B | $5Al_2O_3 \cdot 3.43MgO:Eu^{2+}_{0.05}$ | 17 | 120 | 105 |
| C | $5Al_2O_3 \cdot 3.43MgO \cdot 0.50SiO_2:Eu^{2+}_{0.06}$ | 32 | 150 | 220 |
| D | $5Al_2O_3 \cdot 3.43MgO \cdot 1.0SiO_2:Eu^{2+}_{0.06}$ | 18 | 160 | 275 |
| E | $5Al_2O_3 \cdot 3.43MgO \cdot 1.5SiO_2:Eu^{2+}_{0.06}$ | 16 | 160 | 315 |
| F | $5Al_2O_3 \cdot 3.43MgO \cdot 2.0SiO_2:Eu^{2+}_{0.06}$ | 15 | 145 | 305 |

When equal atom fractions of magnesium and silicon are employed in the formulation, the following results were obtained:

TABLE II

| Sample | Formulation | Plaque | | |
|---|---|---|---|---|
| | | Red | Green | Blue |
| A | $Al_2O_3:Eu^{2+}_{0.01}$ | 6 | 22 | 47 |
| B | $0.99Al_2O_3 \cdot 0.01SiO_2 \cdot 0.01MgO:Eu^{2+}_{0.01}$ | 8 | 51 | 64 |
| C | $0.95Al_2O_3 \cdot 0.50SiO_2 \cdot 0.05MgO:Eu^{2+}_{0.01}$ | 15 | 100 | 140 |
| D | $0.90Al_2O_3 \cdot 0.10SiO_2 \cdot 0.10MgO:Eu^{2+}_{0.01}$ | 21 | 160 | 260 |
| E | $0.80Al_2O_3 \cdot 0.20SiO_2 \cdot 0.20MgO:Eu^{2+}_{0.01}$ | 15 | 160 | 290 |

As indicated previously, I have discovered that the europium activator should be incorporated within a range of 0.001 to 0.20 gram atoms per gram mole of $Al_2O_3$. Below this range the material is substantially inert to radiation at 2537A, while above this the brightness is diminished and the cost of preparing the phosphor becomes inordinate.

The following specific examples are offered as ways of preparing the phosphors according to my invention and are not intended to be limitative upon the claims:

EXAMPLE I

Mix together in a blender the following ingredients:
 2.548 gms.—$3MgCO_3 \cdot Mg(OH)_2 \cdot 3H_2O$
 1.676 gms.—$SiO_2$
 11.383 gms.—$Al_2O_3$
 0.535 gm.—$Eu(NO_3)_3 \cdot 6H_2O$ These ingredients are blended together for 15 minutes and then fired for 1 hour at 650° C. in air. They are then broken up and refired in a reducing atmosphere of 20 percent hydrogen and 80 percent nitrogen.

EXAMPLE II

The same procedure as outlined in Example I is followed except the ingredients are:
- 6.138 gms.—$3MgCO_3 \cdot Mg(OH_2) \cdot 3H_2O$
- 1.767 gms.—$SiO_2$
- 9.972 gms.—$Al_2O_3$
- 0.535 gm.—$Eu(NO_3)_3 \cdot 6H_2O$ It is apparent that modifications and changes can be made within the spirit and scope of the instant invention but it is my intention, however, only to be limited by the scope of the appended claims.

I claim:

1. A phosphor consisting essentially, and having significant quantities, of both of the coexisting solution phases of the spinel structure of $MgAl_2O_4$ and the corundum structure of $\alpha$–$Al_{23}$, the essential cations of each structure being Al, Mg and Si, the phosphor being activated by europium, said corundum phase having the formula $$[(Al^{3+})(Si^{4+})(Mg^{2+})]_2{}^{VI}O_3:Eu^{2+}{}_{0.001-0.20}$$

wherein the $Si^{4+}$ and $Mg^{2+}$ ions displace $Al^{3+}$ ions and are disposed in the corundum lattice of $Al_2O_3$ but in quantities less than the limit of mutual solubility of said ions in said corundum lattice, the $Eu^{2+}$ ions displacing $Mg^{2+}$ ions in the corundum lattice within the specified range, said spinel phase having the formula $$[(Mg)(Si)(\Box)]^{IV}Al_2{}^{VI}O_4:Eu^{2+}{}_{0.001-0.20}$$

where $\Box$ represents the vacancies formed in the cation lattice to preserve electroneutrality and wherein the Si atoms and the $\Box$ displace Mg atoms in the spinel lattice of $MgAl_2O_4$, but in quantities less than the limit of solubility of said atoms and $\Box$ in said spinel lattice, the $Eu^{2+}$ ions displacing Mg atoms in the spinel lattice within the specified range, each of said phases being present in the phosphor in amounts sufficient to produce a level of luminescence above that produced by each phase separately.

2. A fluorescent lamp including a glass envelope, electrodes disposed at each end of said ) means, to produce an electric discharge in said envelope and a luminescent layer coated upon said envelope, said layer including a phosphor consisting essentially, and having significant quantities, of both of the coexisting solution phases of the spinel structure of $MgAl_2O_4$ and the corundum structure of $\alpha$–$Al_2O_3$, the essential cations of each structure being Al, Mg and Si, the phosphor being activated by europium, said corundum phase having the formula $$[(Al^{3+})(Si^{4+})(Mg^{2+})]_2{}^{VI}O_3:Eu^{2+}{}_{0.001-0.20}$$

wherein the $Si^{4+}$ and $Mg^{2+}$ ions displace $Al^{3+}$ ions and are disposed in the corundum lattice of $Al_2O_3$ but in quantities less than the limit of mutual solubility of said ions in said corundum lattice, the $Eu^{2+}$ ions displacing $Mg^{2+}$ ions in the corundum lattice within the specified range, said spinel phase having the formula $$[(Mg)(Si)(\Box)]^{IV}Al_2{}^{VI}O_4:Eu^{2+}{}_{0.001-0.20}$$

where $\Box$ represents the vacancies formed in the cation lattice to preserve electroneutrality and wherein the Si atoms and the $\Box$ displace Mg atoms in the spinel lattice of $MgAl_2O_4$, but in quantities less than the limit of solubility of said atoms and $\Box$ in said spinel lattice, the $Eu^{2+}$ ions displacing Mg atoms in the spinel lattice within the specified range, each of said phases being present in the phosphor in amounts sufficient to produce a level of luminescence above that produced by each phase separately.

3. A mercury lamp including an arc tube surrounded by a bulbous glass jacket, said jacket having a luminescent layer coated upon said envelope, said layer including a phosphor consisting essentially, and having significant quantities, of both of the coexisting solution phases of the spinel structure of $MgAl_2O_4$ and the corundum structure $\alpha$–$Al_2O_3$, the essential cations of each structure being Al, Mg and Si, the phosphor being activated by europium said corundum phase having the formula $$[(Al^{3+})(Si^{4+})(Mg^{2+})]_2{}^{VI}O_3:Eu^{2+}{}_{0.001-0.20}$$

wherein the $Si^{4+}$ and $Mg^{2+}$ ions displace $Al^{3+}$ ions and are disposed in the corundum lattice of $Al_2O_3$ but in quantities less than the limit of mutual solubility of said ions in said corundum lattice, the $Eu^{2+}$ ions displacing $Mg^{2+}$ ions in the corundum lattice within the specified range, said spinel phase having the formula $$[(Mg)(Si)(\Box)]^{IV}Al_2{}^{VI}O_4:Eu^{2+}{}_{0.001-}$$

where 0.20 where represents the vacancies formed in the cation lattice to preserve electroneutrality and wherein the Si atoms and the $\Box$ displace Mg atoms in the spinel lattice of $MgAl_2O_4$, but in quantities less than the limit of solubility of said atoms and $\Box$ in said spinel lattice, the $Eu^{2+}$ ions displacing Mg atoms in the spinel lattice within the specified range, each of said phases being present in the phosphor in amounts sufficient to produce a level of luminescence above that produced by each phase separately.

UNITED STATES PATENT OFFICE
CERTIFICATE OF CORRECTION

Patent No. 3,577,169                    Dated MAY 4, 1971

Inventor(s) THOMAS L. BARRY

It is certified that error appears in the above-identified patent and that said Letters Patent are hereby corrected as shown below:

At column 1, line 16: insert a parenthesis sign before "$A^{2+IV}B_2^{3+VI}O_4)$"; line 43: change "$si^{4+}$" to "$Si^{4+}$"; line 50: change "divalent" to "of"; line 57: change "$Al^{3+}{}_{2-2w}Si^{4+}{}_{AQw}Mg^{2+}{}_{wlv}$" to "$Al^{3+}{}_{2-2w}Si^{4+}{}_{w}Mg^{2+}{}_{w-v}$"; line 62: change "$Mg_{112x1y}$" to "$Mg_{1-2x-y}$".

At column 2, line 5: change "Nm" to "nm";

At column 3, line 23: change "$Al_{23}$" to "$Al_2O_3$"; line 34: between "where" and "represents" insert --▢--; line 36: change "⌐" to "▢"; line 44: between "said" and "means" delete the parenthesis sign and insert --envelope--.

At column 4, line 39: delete "0.20 where" and insert --▢--.

Signed and sealed this 9th day of November 1971.

(SEAL)
Attest:

EDWARD M. FLETCHER, JR.                ROBERT GOTTSCHALK
Attesting Officer                      Acting Commissioner of Patents